(12) United States Patent
Nagarajan et al.

(10) Patent No.: US 11,296,623 B2
(45) Date of Patent: *Apr. 5, 2022

(54) EMERGENCY BRAKING FOR A DRIVE SYSTEM

(71) Applicant: Otis Elevator Company, Farmington, CT (US)

(72) Inventors: Prasanna Nagarajan, Farmington, CT (US); Shashank Krishnamurthy, Glastonbury, CT (US); Konda Reddy Chevva, Ellington, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/862,961

(22) Filed: Apr. 30, 2020

(65) Prior Publication Data
US 2020/0259430 A1 Aug. 13, 2020

Related U.S. Application Data

(63) Continuation of application No. 15/718,607, filed on Sep. 28, 2017, now Pat. No. 10,680,538.

(51) Int. Cl.
*H02P 3/26* (2006.01)
*H02P 3/14* (2006.01)
(Continued)

(52) U.S. Cl.
CPC ............... *H02P 3/26* (2013.01); *B66B 1/32* (2013.01); *H02P 3/025* (2013.01); *H02P 3/04* (2013.01);
(Continued)

(58) Field of Classification Search
CPC .... H02P 23/06; H02P 3/26; H02P 6/24; H02P 3/16; H02P 3/14; H02P 3/04; H02P 3/22;
(Continued)

(56) References Cited

U.S. PATENT DOCUMENTS 4,039,914 A 8/1977 Steigerwald et al.
4,506,766 A 3/1985 Watanabe
(Continued)

FOREIGN PATENT DOCUMENTS

CN 1311152 9/2001
CN 1623882 6/2005
(Continued)

OTHER PUBLICATIONS

EP Application No. 18197720.8 Extended EP Search Report dated Jan. 29, 2019, 8 pages.
(Continued)

*Primary Examiner* — Rina I Duda
(74) *Attorney, Agent, or Firm* — Cantor Colburn LLP (57) ABSTRACT

A system includes a converter operatively connected to an alternating current (AC) power source and a direct current (DC) bus, an inverter operatively connected to a motor and the DC bus, and a controller. The converter includes a first plurality of switching devices in selective communication with each phase of the AC power source and the DC bus. The inverter includes a second plurality of switching devices in selective communication with each phase of a plurality of phases of the motor and the DC bus. The controller is operable to command dropping of a brake through a passive delay circuit responsive to detection of an emergency stop condition for a load driven by the motor and reduce a voltage on the DC bus by dropping at least one phase of the AC power source and/or using a dynamic braking resistor prior to the brake physically dropping.

20 Claims, 6 Drawing Sheets (51) Int. Cl.
*B66B 1/32* (2006.01)
*H02P 3/04* (2006.01)
*H02P 3/22* (2006.01)
*H02P 3/02* (2006.01)
*H02P 6/24* (2006.01)
*H02P 3/16* (2006.01)

(52) U.S. Cl.
CPC .................. *H02P 3/14* (2013.01); *H02P 3/16* (2013.01); *H02P 3/22* (2013.01); *H02P 6/24* (2013.01)

(58) Field of Classification Search
CPC ... H02P 3/025; B66B 1/32; B66B 1/24; B66B 1/2416; B66B 5/02; B66B 13/22
See application file for complete search history.

(56) References Cited

U.S. PATENT DOCUMENTS

| | | | |
|---|---|---|---|
| 4,672,277 A | 6/1987 | Makinen et al. | |
| 4,712,054 A | 12/1987 | Boldt | |
| 5,070,290 A * | 12/1991 | Iwasa | H02P 23/06 318/758 |
| 5,083,634 A | 1/1992 | Yonemoto | |
| 5,361,022 A | 11/1994 | Brown | |
| 5,847,533 A * | 12/1998 | Hakala | H02P 6/24 318/798 |
| 5,893,432 A | 4/1999 | Nguyen et al. | |
| 5,969,303 A | 10/1999 | Piserchia et al. | |
| 6,056,088 A | 5/2000 | Gerstenkorn | |
| 6,273,234 B1 | 8/2001 | Balzer-Apke et al. | |
| 6,422,351 B2 * | 7/2002 | Tajima | B66B 1/285 187/290 |
| 6,498,448 B2 * | 12/2002 | Shimogama | B60T 7/22 192/222 |
| 6,900,606 B2 | 5/2005 | Youm | |
| 7,374,020 B2 * | 5/2008 | Smith | B66B 1/28 187/289 |
| 7,781,997 B2 | 8/2010 | Kallioniemi et al. | |
| 8,146,714 B2 * | 4/2012 | Blasko | B66B 5/0031 187/290 |
| 8,427,004 B2 | 4/2013 | Kitanaka | |
| 8,585,158 B2 * | 11/2013 | Gewinner | B66B 1/32 303/199 |
| 8,890,448 B2 | 11/2014 | Putkinen et al. | |
| 9,126,804 B2 | 9/2015 | Widmer | |
| 9,340,111 B2 | 5/2016 | Kitanaka | |
| 2006/0214624 A1 | 9/2006 | Jahkonen | |
| 2011/0162913 A1 | 7/2011 | Kattainen et al. | |
| 2012/0118675 A1 * | 5/2012 | Abad | B66B 1/32 187/288 |
| 2013/0043097 A1 | 2/2013 | Widmer | |
| 2015/0053507 A1 | 2/2015 | Kattainen et al. | |
| 2016/0101963 A1 | 4/2016 | Nakari | |
| 2019/0097551 A1 | 3/2019 | Nagarajan et al. | |

FOREIGN PATENT DOCUMENTS

| | | |
|---|---|---|
| CN | 101177230 A | 5/2008 |
| CN | 103619744 A | 3/2014 |
| CN | 106379809 | 2/2017 |
| EP | 0903314 | 3/1999 |
| EP | 2347985 | 7/2011 |
| WO | 8809584 | 12/1988 |

OTHER PUBLICATIONS

HowTo: How an Inverter Drive Works and controls the Speed of an AC Induction Motor, Inverter Drive Supermarket 2017, https://inverterdrive.com/HowTo/inv/, 2 pages.
Invertek Drives.com, Braking and Regeneration, iKnow Variable Frequency Drives, Article 14, retrieved from the internet on Sep. 25, 2017: http://www.invertekdrives.com/variable-frequency-drives/braking-and-regeneration-14.aspx, 3 pages.
N. Marchitto, Continuing Education: Engineering, Electrically Assisted Braking Using DC Hoist Motors, www.elevatorworld.com, Feb. 2011, 14 pages.
CN Application No. 201811131604.4 Third Office Action dated May 26, 2021 with English Translation, 7 pages.
IN Application No. 201814035531 First Examination Report dated Oct. 8, 2021, 6 pages.

* cited by examiner

EMERGENCY BRAKING FOR A DRIVE SYSTEM

CROSS-REFERENCE TO RELATED APPLICATIONS

This application is a continuation of U.S. patent application Ser. No. 15/718,607 filed Sep. 28, 2017, the disclosure of which is incorporated by reference herein in its entirety.

BACKGROUND

The subject matter disclosed herein relates generally to drive systems, and more particularly to emergency braking for a drive system.

Drive systems are used in many applications to control movement of a connected load using a motor. In conveyance systems, motors can be used to both move and hold a load in a position, such as controlling movement and positioning of an elevator car. A physical brake is engaged in certain situations to hold or secure an elevator car in a stopped position. Under some types of failure conditions, active control of braking and motor torque may be allowed to control speed, such as during a power failure event. In some emergency conditions, active control of the brakes is not allowed, which can result in a more jarring emergency stopping event for passengers.

BRIEF SUMMARY

According to an exemplary embodiment, a system includes a converter operatively connected to an alternating current (AC) power source and a direct current (DC) bus, an inverter operatively connected to a motor and the DC bus, and a controller. The converter includes a first plurality of switching devices in selective communication with each phase of the AC power source and the DC bus. The inverter includes a second plurality of switching devices in selective communication with each phase of a plurality of phases of the motor and the DC bus. The controller is configured to command dropping of a brake through a passive delay circuit responsive to detection of an emergency stop condition for a load driven by the motor and reduce a voltage on the DC bus by dropping at least one phase of the AC power source and/or using a dynamic braking resistor prior to the brake physically dropping.

In addition to one or more of the features described above or below, or as an alternative, further embodiments may include where the controller is further configured to command the inverter to an off state responsive to detection of the emergency stop condition.

In addition to one or more of the features described above or below, or as an alternative, further embodiments may include where the controller is further configured to apply a voltage down ramping function to the motor responsive to the detection of the emergency stop condition.

In addition to one or more of the features described above or below, or as an alternative, further embodiments may include where the controller is configured to monitor a speed of the motor and continue applying the voltage down ramping function to the motor until a threshold condition is met.

In addition to one or more of the features described above or below, or as an alternative, further embodiments may include the controller is configured to open one or more of the first plurality of switching devices to reduce the voltage on the DC bus.

In addition to one or more of the features described above or below, or as an alternative, further embodiments may include where the controller is operable to selectively establish an electrical connection between a high side and a low side of the DC bus through the dynamic brake resistor to reduce the voltage on the DC bus.

In addition to one or more of the features described above or below, or as an alternative, further embodiments may include a DC link capacitor between the high side and the low side of the DC bus.

In addition to one or more of the features described above or below, or as an alternative, further embodiments may include where the controller is further configured to return voltage from the DC bus to the AC power source through the converter.

In addition to one or more of the features described above or below, or as an alternative, further embodiments may include where the passive delay circuit includes at least one diode in series.

In addition to one or more of the features described above or below, or as an alternative, further embodiments may include where the load is a passenger conveyance driven by the motor.

According to another embodiment, a method includes operably connecting a converter to an AC power source and a DC bus, where the converter includes a first plurality of switching devices in selective communication with each phase of the AC power source and the DC bus. An inverter is operably connected to a motor and the DC bus, where the inverter includes a second plurality of switching devices in selective communication with each phase of a plurality of phases of the motor and the DC bus. A controller commands dropping of a brake through a passive delay circuit responsive to detection of an emergency stop condition for a load driven by the motor, and a voltage on the DC bus is reduced prior to the brake physically dropping.

Technical effects of embodiments of the present disclosure include providing enhanced emergency stopping in a drive system.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The present disclosure is illustrated by way of example and not limited in the accompanying figures in which like reference numerals indicate similar elements.

DETAILED DESCRIPTION

A detailed description of one or more embodiments of the disclosed systems and method are presented herein by way of exemplification and not limitation with reference to the Figures. In general, embodiments herein relate to emergency braking for motor drives employing an active converter to supply a direct current (DC) bus that in turn supplies voltage to an inverter that generates motor excitation signals to drive a motor. Emergency braking response is enhanced by commanding the dropping of a brake through a passive delay circuit while reducing voltage supplied to the motor to smooth the stopping response of a load driven by the motor. Embodiments herein set forth a drive and motor system for a converter to actively control a DC voltage typically generated from an alternating current (AC) side sinusoidal current. The DC voltage is employed to generate AC excitation voltage using fast switching of power electronics devices to control a motor.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended. The following description is merely illustrative in nature and is not intended to limit the present disclosure, its application or uses. It should be understood that throughout the drawings, corresponding reference numerals indicate like or corresponding parts and features. As used herein, the term controller refers to processing circuitry that may include an application specific integrated circuit (ASIC), a field programmable gate array (FPGA), an electronic circuit, an electronic processor (shared, dedicated, or group) and memory that executes one or more software or firmware programs stored in a non-transitory form, a combinational logic circuit, and/or other suitable interfaces and components that provide the described functionality.

Figure 1:
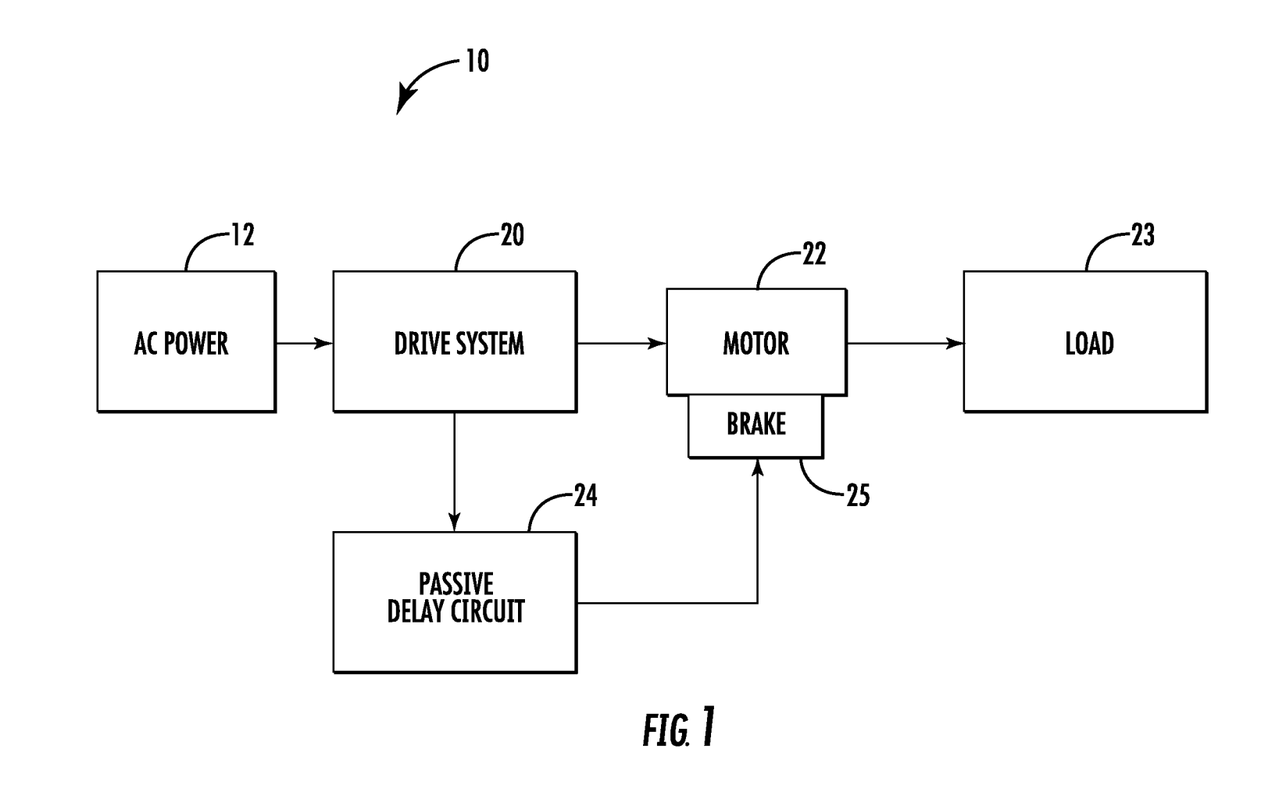
FIG. 1 is a block diagram of components of a power system in accordance with an embodiment.

FIG. 1 is a block diagram of components of a power system 10 of an embodiment as may be employed to power one or more loads 23. Power system 10 includes an AC power source 12, such as an electrical main line (e.g., 440 volt, 3-phase). The AC power source 12 provides AC power to a drive system 20. The drive system 20 may be operable as a motor drive and a regenerative drive capable of harnessing regenerative energy from a motor 22 during braking of a load 23 being driven. The drive system 20 can also trigger engagement of a brake 25 through a passive delay circuit 24 to stop movement of the load 23. The passive delay circuit 24 can include one or more passive delay inducing electrical components, such as one or more diodes, capacitors, inductors, and the like. The passive delay circuit 24 avoids actively delaying physical braking of the motor 22 and/or load 23 while actively slowing rotation of the motor 22 by the drive system 20. The brake 25 is a mechanical brake operable to close by spring force or similar mechanism to rapidly stop movement of the load 23 responsive to a brake command propagated through the passive delay circuit 24. In an embodiment, the power system 10 is described with respect to an elevator system 101 (FIG. 4); however, application to any system where a motor drive is employed may be envisioned. For example, in some embodiments, the load 23 can be any type of passenger conveyance driven by a motor, such as an escalator, moving walkway, trolley, or the like.

Figure 2:
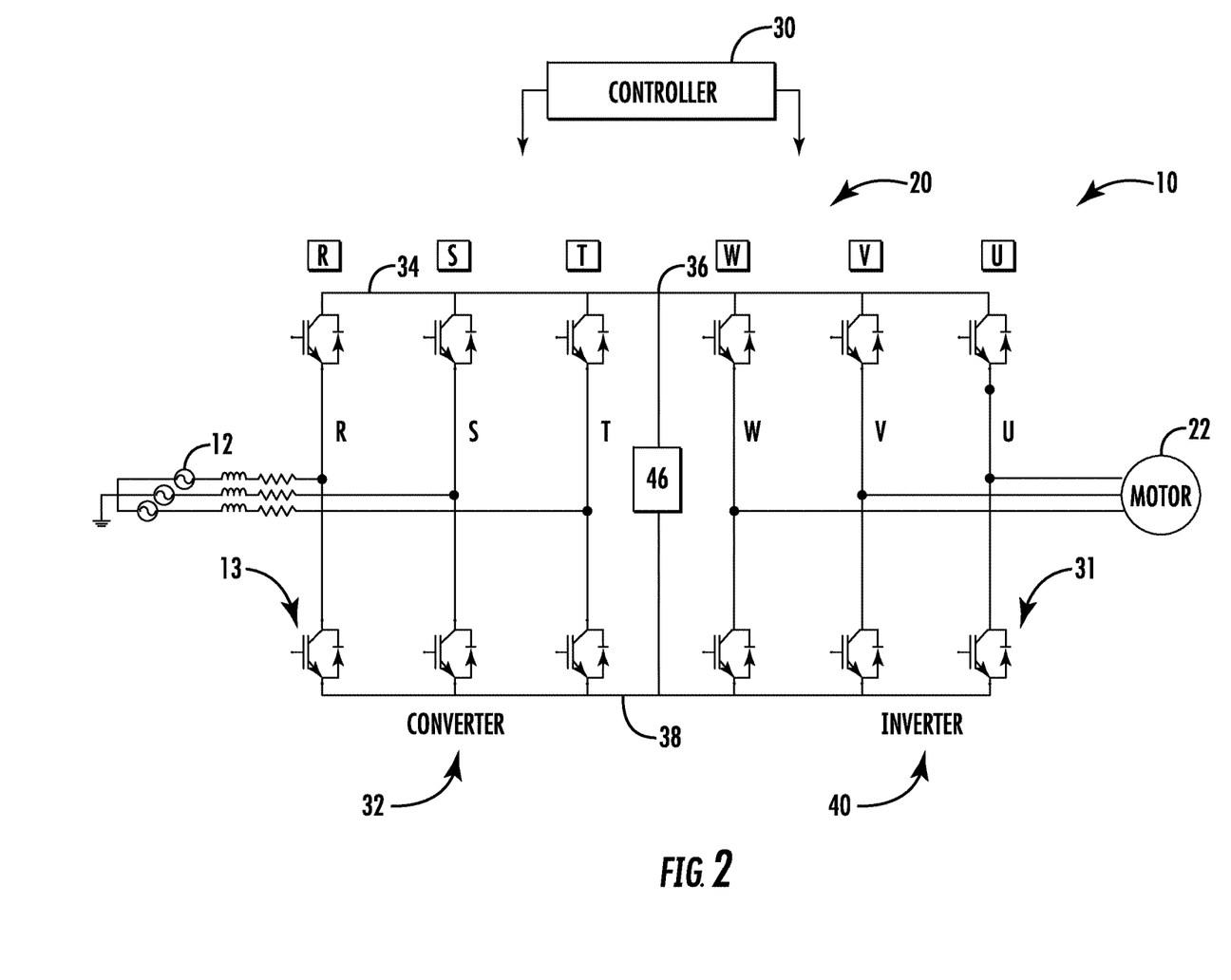
FIG. 2 is a simplified schematic of a drive system in accordance with an embodiment.

FIG. 2 is a simplified schematic of the power system 10 with the drive system 20 depicted in greater detail. The AC power source 12 in the power system 10 can be, for example, an electrical main line (e.g., 440 volt, 3-phase). In the example of FIG. 2, the drive system 20 can be a regenerative drive that includes a converter 32 having 3 phase legs, R, S, and T. Each phase leg, R, S, and T, includes switching devices 13 controlled by control signals from a controller 30 to convert AC power to DC power on a DC bus 34 having a high side 36 and a low side 38. The drive system 20 also includes an inverter 40 having 3 phase legs, W, V, and U. Each phase leg, W, V, and U, includes switching devices 31 controlled by control signals from the controller 30 to convert DC power across the DC bus 34 to AC drive signals to power the motor 22. In embodiments, a DC link circuit 46 is operably connected between the high side 36 and the low side 38 of the DC bus 34 to selectively dissipate energy of the DC bus 34 as further described herein. The controller 30 is operable to trigger a brake closure command through the passive delay circuit 24 of FIG. 1 to physically drop the brake 25 of FIG. 1 and halt motion of the load 23. The controller 30 may be implemented using a general-purpose microprocessor executing a computer program stored on a storage medium to perform the operations described herein. Alternatively, the controller 30 may be implemented in hardware (e.g., ASIC, FPGA) or in a combination of hardware/software.

Figure 3:
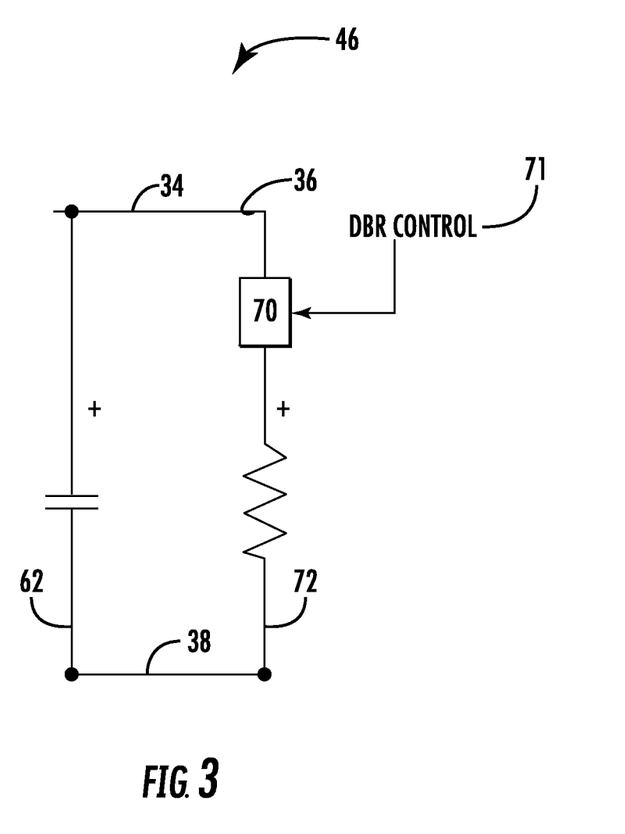
FIG. 3 is a simplified schematic of a direct current link circuit in accordance with an embodiment.

FIG. 3 depicts the DC link circuit 46 in greater detail in accordance with an exemplary embodiment. In the example of FIG. 3, the DC link circuit 46 includes a DC link capacitor 62 in parallel with an a switching element 70 in series with a dynamic brake resistor 72 between the high side 36 and the low side 38 of the DC bus 34. The controller 30 of FIG. 2 is operable to trigger opening or closure of the switching element 70 through a dynamic braking control signal 71. During normal operation, the switching element 70 is commanded open to remove an electrical path through the dynamic brake resistor 72. When the dynamic brake resistor 72 is not electrically connected to both the high side 36 and the low side 38 of the DC bus 34, the DC link capacitor 62 can be charged on the DC bus 34 and may function to reduce ripple currents. In a braking condition, the switching element 70 closes responsive to the dynamic braking control signal 71, and an electrical connection is established between the high side 36 and the low side 38 of the DC bus 34 through the dynamic brake resistor 72 to reduce the voltage on the DC bus 34. When electrically connected in parallel with the DC link capacitor 62, the dynamic brake resistor 72 is operable to dissipate energy and ramp down voltage on the DC bus 34 to slow the motor 22 of FIGS. 1 and 2. In some embodiments, the switching element 70 and the dynamic brake resistor 72 are omitted and voltage down ramping can be provided by controlling the state of converter 32 of FIG. 2 or other voltage reduction elements. It will be understood that the DC link circuit 46 can include other elements not depicted in FIG. 3, such as monitoring circuits.

Figure 4:
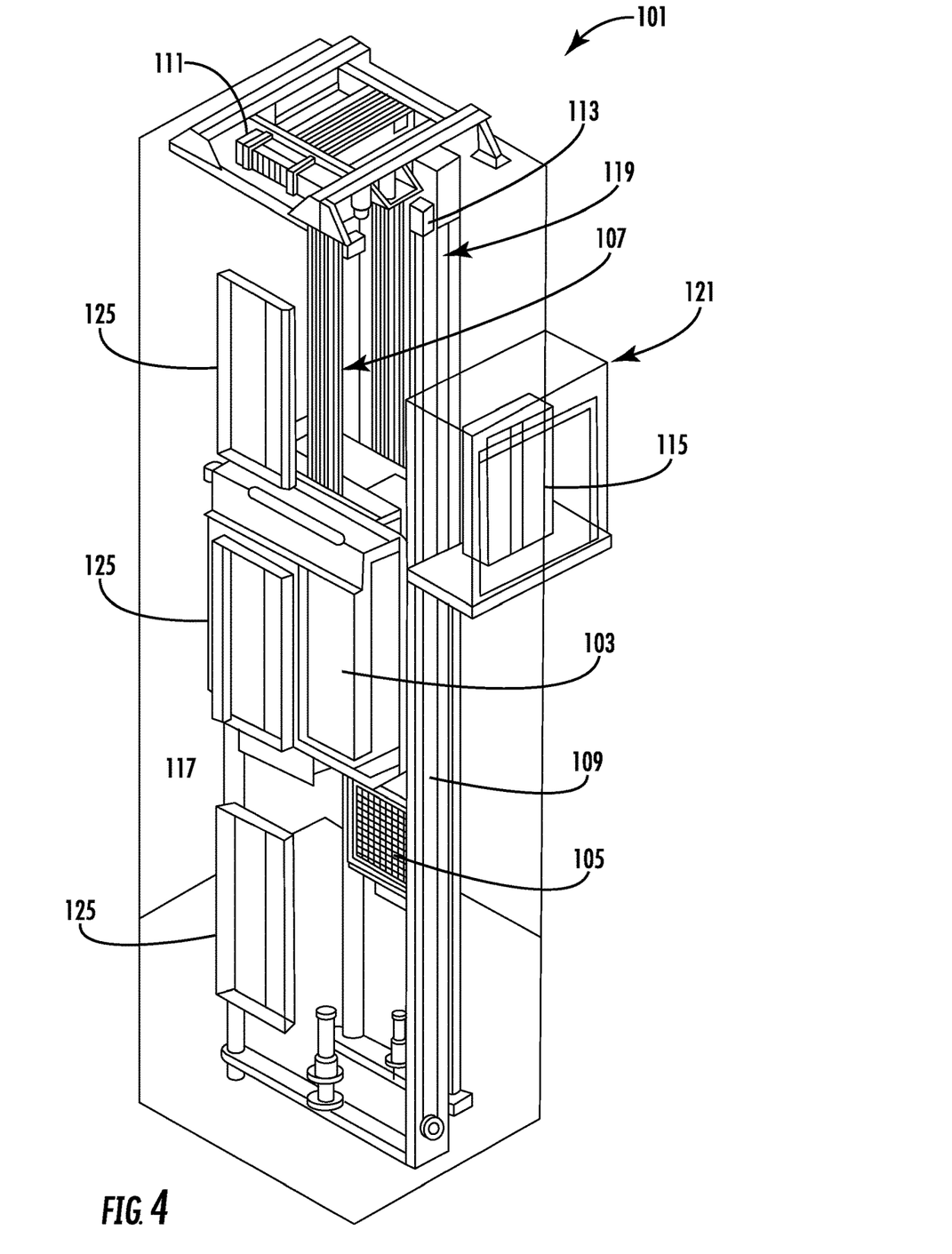
FIG. 4 is a simplified schematic of an elevator system in accordance with an embodiment.

FIG. 4 is a perspective view of an elevator system 101 including an elevator car 103, a counterweight 105, one or more load bearing members 107, a guide rail 109, a machine 111, a position encoder 113, and an elevator controller 115. The elevator car 103 and counterweight 105 are connected to each other by the load bearing members 107. The load bearing members 107 may be, for example, ropes, steel cables, and/or coated-steel belts. The counterweight 105 is configured to balance a load of the elevator car 103 and is configured to facilitate movement of the elevator car 103 concurrently and in an opposite direction with respect to the counterweight 105 within an elevator shaft 117 and along the guide rail 109. The elevator car 103 and counterweight 105 are examples of the load 23 of FIG. 1, where the elevator car 103 is a passenger conveyance.

The load bearing members 107 engage the machine 111, which is part of an overhead structure of the elevator system 101. The machine 111 is configured to control movement between the elevator car 103 and the counterweight 105. The position encoder 113 may be mounted on an upper sheave of a speed-governor system 119 and may be configured to provide position signals related to a position of the elevator car 103 within the elevator shaft 117. In other embodiments, the position encoder 113 may be directly mounted to a moving component of the machine 111, or may be located in other positions and/or configurations as known in the art.

The elevator controller 115 is located, as shown, in a controller room 121 of the elevator shaft 117 and is configured to control the operation of the elevator system 101, and particularly the elevator car 103. For example, the elevator controller 115 may include the drive system 20 of FIGS. 1 and 2 provide drive signals to the machine 111 to control the acceleration, deceleration, leveling, stopping, etc. of the elevator car 103. The elevator controller 115 may also be configured to receive position signals from the position encoder 113. When moving up or down within the elevator shaft 117 along guide rail 109, the elevator car 103 may stop at one or more landings 125 as controlled by the elevator controller 115. Although shown in a controller room 121, those of skill in the art will appreciate that the elevator controller 115 can be located and/or configured in other locations or positions within the elevator system 101. In some embodiments, the elevator controller 115 can be configured to control features within the elevator car 103, including, but not limited to, lighting, display screens, music, spoken audio words, etc.

The machine 111 may include the motor 22 of FIGS. 1 and 2 and a braking system including the brake 25 and passive delay circuit 24 of FIG. 1. Although shown and described with a rope-based load bearing system, elevator systems that employ other methods and mechanisms of moving an elevator car within an elevator shaft using the motor 22, brake 25, and passive delay circuit 24 of FIG. 1 may employ embodiments of the present disclosure. FIG. 4 is merely a non-limiting example presented for illustrative and explanatory purposes.

Figure 5:
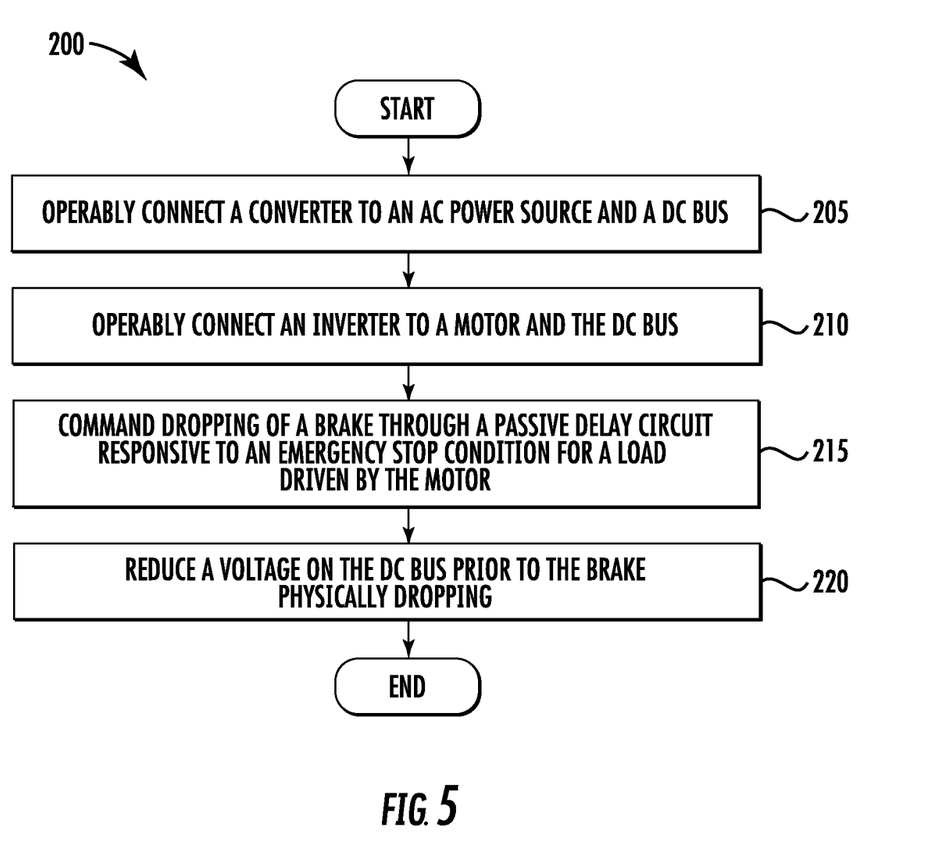
FIG. 5 depicts a flowchart of a method in accordance with an embodiment.

FIG. 5 depicts a flowchart of a method 200 in accordance with an embodiment. The method 200 is described in reference to FIGS. 1-5 and may include additional elements beyond those depicted and described in FIG. 5. The order of the method 200 is not limited by the sequence of FIG. 5, which provides an example for purposes of explanation.

At block 205, a converter 32 is operably connected to an AC power source 12 and a DC bus 34. The converter 32 includes a first plurality of switching devices 13 in selective communication with each phase R, S, T of the AC power source 12 and the DC bus 34.

At block 210, an inverter 40 is operatively connected to a motor 22 and the DC bus 34. The inverter 40 includes a second plurality of switching devices 31 in selective communication with each phase W, V, U of the motor 22 and the DC bus 34.

At block 215, the controller 30 commands dropping of the brake 25 through the passive delay circuit 24 responsive to an emergency stop condition for the load 23 driven by the motor 22. An emergency condition can be detected as any external event that results in a loss of a safety chain to drive the motor 22 or other such operating conditions detected by the drive system 20. The safety chain is an electrical signal that passed through contactors and is a drive input. The safety chain controls at least one relay that can interrupt the flow of energy to the motor 22 and/or brake 25. If a contactor opens, interrupting the safety chain signal, the drive system 20 can lose the ability to apply power to the motor 22 and/or drop the brake 25. As one example, a safety chain signal can pass through contactors on an elevator car door and one or more hoistway doors (e.g., front and rear doors, if present). If any of the contactors open, it can be considered an emergency condition and the drive system 20 loses the safety chain, resulting in an interruption of power to the motor 22 and/or brake 25. Some emergency conditions can be internally detected by the drive system 20, such as a motor current being too high, a velocity tracking fault, a safety fault, and the like.

At block 220, the controller 30 reduces a voltage on the DC bus 34 prior to the brake 25 physically dropping. For example, the passive delay circuit 24 can add a predetermined amount of delay time (e.g., 10-50 milliseconds) to actuation of the brake 25. During the delay period and any inherent actuation delay of the brake 25, the controller 30 actively reduces the speed of the motor 22 by downward ramping of the voltage on the DC bus 34. One or more elements of the DC link circuit 46, such as the dynamic brake resistor 72, can be used to ramp down the voltage on the DC bus 34. As an alternative or in further combination, the controller 30 can control the state of the switching devices 13 of the converter 32 to downward ramp the voltage on the DC bus 34. For instance, one or more phases of the AC power source 12 can be electrically disconnected at the converter 32 to drop one or more of phases of the AC power source 12 while at least one remaining phase can return voltage from the DC bus 34 to the AC power source 12.

Figure 6:
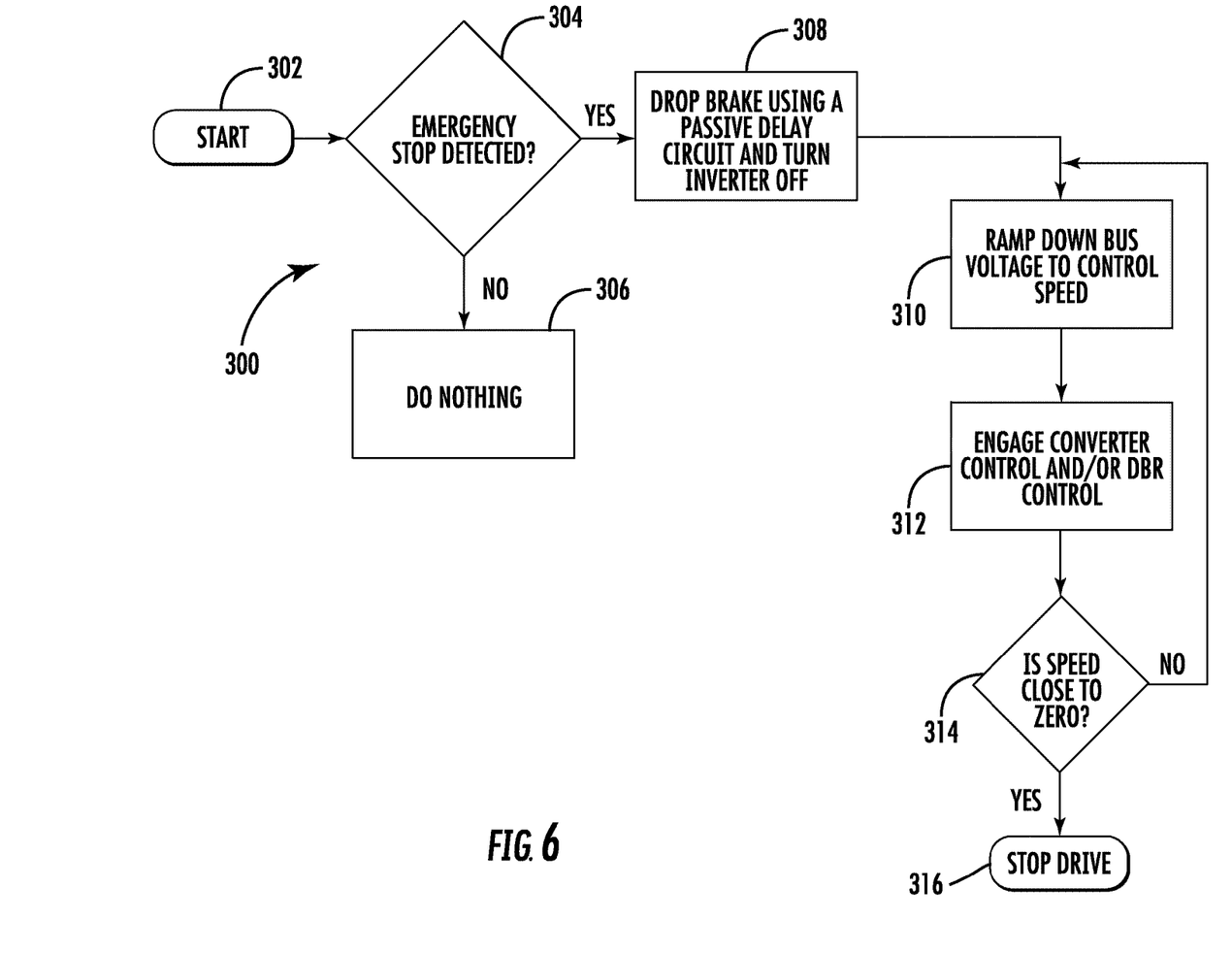
FIG. 6 depicts another flowchart of a method in accordance with an embodiment.

FIG. 6 depicts a flowchart of a method 300 in accordance with an embodiment. The method 300 is described in reference to FIGS. 1-6 and may include additional elements beyond those depicted and described in FIG. 6. The order of the method 300 is not limited by the sequence of FIG. 6, which provides an example for purposes of explanation. The method 300 can be implemented by the controller 30 to more smoothly halt movement of the load 23 in an emergency stop condition.

The method 300 begins at block 302 and emergency stop detection is performed at block 304. An emergency stop condition, as previously described, may trigger an interrupt in the controller 30 to command a rapid stopping of the load 23. If there is no emergency stop condition detected at block 304, then no further emergency related actions need to be performed at block 306. If there is an emergency stop condition detected at block 304, then at the brake 25 is commanded to drop using the passive delay circuit 24 and the inverter 40 may be commanded to an off state responsive to the emergency stop condition at block 308.

The controller 30 initiates a sequence to apply a voltage down ramping function to the motor 22 responsive to the emergency stop condition to control speed reduction of the motor 22 at block 310. Ramping down voltage of the DC bus 34 can be performed by selectively opening switching devices 13 of the converter 32 and/or closing the switching element 70 to establish an electrical connection between the high side 36 and the low side 38 of the DC bus 34 through the dynamic brake resistor 72 to reduce the voltage on the DC bus 34. The controller 30 may also be controlled to return voltage from the DC bus 34 to the AC power source 12. At block 314, the controller 30 can monitor a speed of the motor 22 and continue applying the voltage down ramping function to the motor 22 until a threshold condition is met by repeating blocks 310-314. The threshold condition is a near-zero value with a tolerance, e.g., less than 10 revolutions per minute. If the threshold condition is met, then the drive system 20 can halt operation at block 316 until the emergency stop condition is addressed.

As described herein, in some embodiments various functions or acts may take place at a given location and/or in connection with the operation of one or more apparatuses, systems, or devices. For example, in some embodiments, a portion of a given function or act may be performed at a first device or location, and the remainder of the function or act may be performed at one or more additional devices or locations.

Embodiments may be implemented using one or more technologies. In some embodiments, an apparatus or system may include one or more processors and memory storing instructions that, when executed by the one or more processors, cause the apparatus or system to perform one or more methodological acts as described herein. Various mechanical components known to those of skill in the art may be used in some embodiments.

Embodiments may be implemented as one or more apparatuses, systems, and/or methods. In some embodiments, instructions may be stored on one or more computer program products or computer-readable media, such as a transitory and/or non-transitory computer-readable medium. The instructions, when executed, may cause an entity (e.g., an apparatus or system) to perform one or more methodological acts as described herein.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection".

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A system, comprising:
   a converter operatively connected to an alternating current (AC) power source and a direct current (DC) bus, the converter comprising a first plurality of switching devices in selective communication with each phase of the AC power source and the DC bus;
   an inverter operatively connected to a motor and the DC bus, the inverter comprising a second plurality of switching devices in selective communication with each phase of a plurality of phases of the motor and the DC bus; and
   a controller configured to command dropping of a brake through a passive delay circuit responsive to detection of an emergency stop condition for a load driven by the motor and reduce a voltage on the DC bus by dropping at least one phase of the AC power source and keeping at least one phase active to return voltage from the DC bus to the AC power source.

2. The system of claim 1, wherein the controller is further configured to command the inverter to an off state responsive to the detection of the emergency stop condition.

3. The system of claim 1, wherein the controller is further configured to apply a voltage down ramping function to the motor responsive to the detection of the emergency stop condition.

4. The system of claim 3, wherein the controller is configured to monitor a speed of the motor and continue applying the voltage down ramping function to the motor until a threshold condition is met.

5. The system of claim 1, wherein the controller is configured to open one or more of the first plurality of switching devices to reduce the voltage on the DC bus.

6. The system of claim 1, wherein the controller is configured to selectively establish an electrical connection between a high side and a low side of the DC bus through the dynamic brake resistor to reduce the voltage on the DC bus.

7. The system of claim 6, further comprising a DC link capacitor between the high side and the low side of the DC bus.

8. The system of claim 1, wherein the controller is further configured to return voltage from the DC bus to the AC power source through the converter.

9. The system of claim 1, wherein the passive delay circuit comprises at least one diode in series.

10. The system of claim 1, wherein the load comprises a passenger conveyance driven by the motor.

11. A method comprising:
    operably connecting a converter to an alternating current (AC) power source and a direct current (DC) bus, the converter comprising a first plurality of switching devices in selective communication with each phase of the AC power source and the DC bus;
    operably connecting an inverter to a motor and the DC bus, the inverter comprising a second plurality of switching devices in selective communication with each phase of a plurality of phases of the motor and the DC bus;
    commanding, by a controller, dropping of a brake through a passive delay circuit responsive to detection of an emergency stop condition for a load driven by the motor; and reducing a voltage on the DC bus prior to the brake physically dropping by dropping at least one phase of the AC power source and keeping at least one phase active to return voltage from the DC bus to the AC power source.

12. The method of claim 11, further comprising:
commanding the inverter to an off state responsive to the detection of the emergency stop condition.

13. The method of claim 11, further comprising:
applying a voltage down ramping function to the motor responsive to the detection of the emergency stop condition.

14. The method of claim 13, further comprising:
monitoring a speed of the motor; and
applying the voltage down ramping function to the motor until a threshold condition is met.

15. The method of claim 11, further comprising:
opening one or more of the first plurality of switching devices to reduce the voltage on the DC bus.

16. The method of claim 11 further comprising:
selectively establishing an electrical connection between a high side and a low side of the DC bus through a dynamic brake resistor to reduce the voltage on the DC bus.

17. The method of claim 16, wherein a DC link capacitor is between the high side and the low side of the DC bus.

18. The method of claim 11, wherein
returning voltage from the DC bus to the AC power source is performed through the converter.

19. The method of claim 11, wherein the passive delay circuit comprises at least one diode in series.

20. The method of claim 11, wherein the load comprises a passenger conveyance driven by the motor.

* * * * *